US009053754B2

(12) United States Patent
DeYonker et al.

(10) Patent No.: US 9,053,754 B2
(45) Date of Patent: Jun. 9, 2015

(54) THUMBNAIL GENERATION AND PRESENTATION FOR RECORDED TV PROGRAMS

(75) Inventors: Aaron DeYonker, Seattle, WA (US); Jeffrey C Fong, Seattle, WA (US); Todd San Jule, Woodinville, WA (US); Zhike Kong, Beijing (CN); Bin Lin, Beijing (CN); Nishad Mulye, Redmond, WA (US); Joseph Alton Schrader, Los Altos, CA (US); Thomas H. Taylor, Redmond, WA (US); Xinli Zou, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 973 days.

(21) Appl. No.: 10/900,923

(22) Filed: Jul. 28, 2004

(65) Prior Publication Data
US 2006/0107289 A1 May 18, 2006

(51) Int. Cl.
H04N 7/173 (2011.01)
G06F 3/00 (2006.01)
G06F 13/00 (2006.01)
H04N 5/445 (2011.01)
G11B 27/34 (2006.01)
(Continued)

(52) U.S. Cl.
CPC .............. *G11B 27/34* (2013.01); *G11B 27/329* (2013.01); *H04N 21/47214* (2013.01); *G11B 27/105* (2013.01); *H04N 5/44543* (2013.01); *H04N 5/44591* (2013.01)
USPC ................................. 725/100; 725/39; 725/50

(58) Field of Classification Search
USPC ........................................................... 725/55
See application file for complete search history.

(56) References Cited

U.S. PATENT DOCUMENTS 5,333,091 A * 7/1994 Iggulden et al. ................ 386/55
5,442,633 A 8/1995 Perkins et al.
(Continued)

FOREIGN PATENT DOCUMENTS

EP 0597450 5/1994
EP 1 168 840 A2 1/2002
(Continued)

OTHER PUBLICATIONS

"Visual Attention Based Image Browsing on Mobile Devices" 4 pages, Fan et al.
(Continued)

*Primary Examiner* — Mark D Featherstone
(74) *Attorney, Agent, or Firm* — Miia Sula; Judy Yee; Micky Minhas

(57) ABSTRACT

Thumbnail images representative of recorded TV programs are generated and presented to aid a user in browsing the recorded TV programs. In one implementation, a temporary thumbnail image is generated when a TV program first starts recording. The temporary thumbnail is used to populate any user interface (UI) screens that reference the recoded TV program. Once the TV program has reached a threshold amount of recording (e.g., a prescribed duration of recording, or completion of the recording), a permanent thumbnail image is generated and associated with the TV program. The permanent thumbnail is then presented in any subsequent UI screens, replacing the temporary thumbnail. In another implementation, display of the thumbnail images in the UI screens may be further controlled by setting preferences, such as parental controls.

32 Claims, 6 Drawing Sheets

(51) Int. Cl.
*G11B 27/32* (2006.01)
*H04N 21/472* (2011.01)
*G11B 27/10* (2006.01)

(56) References Cited

U.S. PATENT DOCUMENTS

| | | | |
|---|---|---|---|
| 5,497,430 A | 3/1996 | Sadovnik et al. | |
| 5,530,963 A | 6/1996 | Moore et al. | |
| 5,625,877 A | 4/1997 | Dunn et al. | |
| 5,642,294 A | 6/1997 | Taniguchi et al. | |
| 5,659,685 A | 8/1997 | Williams et al. | |
| 5,710,560 A | 1/1998 | Cohn | |
| 5,745,190 A | 4/1998 | Ioka | |
| 5,751,378 A | 5/1998 | Chen et al. | |
| 5,774,593 A | 6/1998 | Zick et al. | |
| 5,778,137 A | 7/1998 | Nielsen et al. | |
| 5,801,765 A | 9/1998 | Gotoh et al. | |
| 5,821,945 A | 10/1998 | Yeo et al. | |
| 5,835,163 A | 11/1998 | Liou et al. | |
| 5,884,056 A | 3/1999 | Steele | |
| 5,900,919 A | 5/1999 | Chen et al. | |
| 5,901,245 A | 5/1999 | Warnick et al. | |
| 5,911,008 A | 6/1999 | Niikura et al. | |
| 5,920,360 A | 7/1999 | Coleman, Jr. | |
| 5,952,993 A | 9/1999 | Matsuda et al. | |
| 5,956,026 A | 9/1999 | Ratakonda | |
| 5,959,697 A | 9/1999 | Coleman, Jr. | |
| 5,966,126 A | 10/1999 | Szabo | |
| 5,983,273 A | 11/1999 | White et al. | |
| 5,990,980 A | 11/1999 | Golin | |
| 5,995,095 A | 11/1999 | Ratakonda | |
| 6,020,901 A * | 2/2000 | Lavelle et al. | 345/545 |
| 6,047,085 A | 4/2000 | Sato et al. | |
| 6,072,496 A | 6/2000 | Guenter et al. | |
| 6,100,941 A | 8/2000 | Dimitrova et al. | |
| 6,166,735 A | 12/2000 | Dom et al. | |
| 6,168,273 B1 | 1/2001 | Dupraz et al. | |
| 6,182,133 B1 | 1/2001 | Horvitz | |
| 6,232,974 B1 | 5/2001 | Horvitz et al. | |
| 6,236,395 B1 | 5/2001 | Sezan et al. | |
| 6,282,317 B1 | 8/2001 | Luo et al. | |
| 6,292,589 B1 | 9/2001 | Chow et al. | |
| 6,298,145 B1 | 10/2001 | Zhang et al. | |
| 6,307,550 B1 * | 10/2001 | Chen et al. | 345/418 |
| 6,332,163 B1 | 12/2001 | Bowman-Amuah | |
| 6,353,824 B1 | 3/2002 | Boguraev et al. | |
| 6,389,168 B2 | 5/2002 | Altunbasak et al. | |
| 6,404,925 B1 | 6/2002 | Foote et al. | |
| 6,408,128 B1 | 6/2002 | Abecassis | |
| 6,421,675 B1 | 7/2002 | Ryan et al. | |
| 6,449,251 B1 | 9/2002 | Awadallah et al. | |
| 6,462,754 B1 | 10/2002 | Chakraborty et al. | |
| 6,466,702 B1 | 10/2002 | Atkins et al. | |
| 6,473,778 B1 | 10/2002 | Gibbon | |
| 6,516,090 B1 | 2/2003 | Lennon et al. | |
| 6,581,096 B1 | 6/2003 | Cottrille et al. | |
| 6,616,700 B1 | 9/2003 | Thum et al. | |
| 6,622,134 B1 | 9/2003 | Sorkin | |
| 6,631,403 B1 | 10/2003 | Deutsch et al. | |
| 6,643,643 B1 | 11/2003 | Lee et al. | |
| 6,643,665 B2 | 11/2003 | Kimbell et al. | |
| 6,658,059 B1 | 12/2003 | Iu et al. | |
| 6,661,468 B2 * | 12/2003 | Alten et al. | 348/569 |
| 6,670,963 B2 | 12/2003 | Osberger | |
| 6,691,106 B1 | 2/2004 | Sathyanarayan | |
| 6,711,587 B1 | 3/2004 | Dufaux | |
| 6,714,909 B1 | 3/2004 | Gibbon et al. | |
| 6,721,454 B1 | 4/2004 | Qian et al. | |
| 6,773,778 B2 | 8/2004 | Onozawa et al. | |
| 6,792,144 B1 | 9/2004 | Yan et al. | |
| 6,807,361 B1 | 10/2004 | Girgensohn et al. | |
| 6,870,956 B2 | 3/2005 | Qi et al. | |
| 6,934,415 B2 | 8/2005 | Stentiford | |
| 6,938,268 B1 | 8/2005 | Hodge | |
| 6,956,573 B1 | 10/2005 | Bergen et al. | |
| 7,006,091 B2 | 2/2006 | Masera et al. | |
| 7,055,166 B1 | 5/2006 | Logan et al. | |
| 7,062,705 B1 | 6/2006 | Kirkwood et al. | |
| 7,065,707 B2 | 6/2006 | Chen et al. | |
| 7,069,310 B1 | 6/2006 | Bartholomew | |
| 7,072,984 B1 | 7/2006 | Polonsky et al. | |
| 7,095,907 B1 | 8/2006 | Berkner et al. | |
| 7,116,716 B2 | 10/2006 | Ma et al. | |
| 7,248,294 B2 | 7/2007 | Slatter | |
| 7,296,168 B2 | 11/2007 | Edwards | |
| 7,325,199 B1 | 1/2008 | Reid | |
| 7,356,464 B2 * | 4/2008 | Stella et al. | 704/210 |
| 7,546,544 B1 | 6/2009 | Weber et al. | |
| 7,603,626 B2 | 10/2009 | Williams et al. | |
| 7,639,882 B2 | 12/2009 | Itakura | |
| 7,826,709 B2 * | 11/2010 | Moriya et al. | 715/202 |
| 2001/0023450 A1 | 9/2001 | Chu | |
| 2001/0047355 A1 | 11/2001 | Anwar | |
| 2002/0037159 A1 * | 3/2002 | Goto et al. | 386/69 |
| 2002/0067376 A1 * | 6/2002 | Martin et al. | 345/810 |
| 2002/0069218 A1 | 6/2002 | Sull et al. | |
| 2002/0073218 A1 | 6/2002 | Aspromonte et al. | |
| 2002/0100052 A1 * | 7/2002 | Daniels | 725/87 |
| 2002/0116533 A1 | 8/2002 | Holliman et al. | |
| 2002/0154833 A1 | 10/2002 | Koch et al. | |
| 2002/0157116 A1 | 10/2002 | Jasinschi | |
| 2002/0166123 A1 | 11/2002 | Schrader et al. | |
| 2002/0191861 A1 | 12/2002 | Cheatle | |
| 2003/0033347 A1 | 2/2003 | Bolle et al. | |
| 2003/0068087 A1 * | 4/2003 | Wu et al. | 382/190 |
| 2003/0115607 A1 * | 6/2003 | Morioka et al. | 725/61 |
| 2003/0123850 A1 | 7/2003 | Jun et al. | |
| 2003/0152363 A1 | 8/2003 | Jeannin et al. | |
| 2003/0195863 A1 | 10/2003 | Marsh | |
| 2003/0206656 A1 | 11/2003 | Schwartz et al. | |
| 2003/0210886 A1 | 11/2003 | Li et al. | |
| 2003/0237053 A1 | 12/2003 | Chen et al. | |
| 2004/0001106 A1 | 1/2004 | Deutscher et al. | |
| 2004/0039755 A1 | 2/2004 | Kunze | |
| 2004/0039810 A1 | 2/2004 | Donescu et al. | |
| 2004/0040041 A1 | 2/2004 | Crawford | |
| 2004/0068481 A1 | 4/2004 | Seshadri et al. | |
| 2004/0071083 A1 | 4/2004 | Li et al. | |
| 2004/0078357 A1 | 4/2004 | LaChapelle et al. | |
| 2004/0078382 A1 | 4/2004 | Mercer et al. | |
| 2004/0078383 A1 | 4/2004 | Mercer et al. | |
| 2004/0085341 A1 | 5/2004 | Hua et al. | |
| 2004/0086046 A1 | 5/2004 | Ma et al. | |
| 2004/0088726 A1 | 5/2004 | Ma et al. | |
| 2004/0125877 A1 | 7/2004 | Chang et al. | |
| 2004/0128317 A1 * | 7/2004 | Sull et al. | 707/104.1 |
| 2004/0165784 A1 | 8/2004 | Xie et al. | |
| 2004/0184776 A1 * | 9/2004 | Inoue et al. | 386/83 |
| 2004/0236863 A1 | 11/2004 | Shen et al. | |
| 2004/0267952 A1 | 12/2004 | He et al. | |
| 2005/0069225 A1 | 3/2005 | Schneider et al. | |
| 2005/0071328 A1 | 3/2005 | Lawrence | |
| 2005/0084232 A1 | 4/2005 | Herberger et al. | |
| 2005/0114434 A1 | 5/2005 | Yang et al. | |
| 2005/0114784 A1 | 5/2005 | Spring et al. | |
| 2005/0162556 A1 | 7/2005 | Desai | |
| 2005/0169312 A1 | 8/2005 | Cakareski et al. | |
| 2005/0175001 A1 | 8/2005 | Becker Hof et al. | |
| 2005/0192987 A1 | 9/2005 | Marsh | |
| 2005/0207442 A1 | 9/2005 | Zoest et al. | |
| 2005/0257151 A1 | 11/2005 | Wu | |
| 2005/0262439 A1 | 11/2005 | Cameron | |
| 2006/0023748 A1 | 2/2006 | Chandhok et al. | |
| 2006/0026528 A1 | 2/2006 | Paulsen et al. | |
| 2006/0036759 A1 | 2/2006 | Shen et al. | |
| 2006/0074754 A1 | 4/2006 | Toyohara et al. | |
| 2006/0107209 A1 | 5/2006 | Chen et al. | |
| 2006/0123053 A1 | 6/2006 | Scannell | |
| 2006/0179054 A1 | 8/2006 | Levi | |
| 2006/0190435 A1 | 8/2006 | Heidloff et al. | |
| 2006/0190615 A1 | 8/2006 | Panwar et al. | |
| 2006/0200442 A1 | 9/2006 | Parikh | |
| 2006/0239644 A1 | 10/2006 | Barbieri | |
| 2007/0027754 A1 | 2/2007 | Collins et al. | |

(56) References Cited

U.S. PATENT DOCUMENTS

| | | |
|---|---|---|
| 2007/0060099 A1 | 3/2007 | Ramer et al. |
| 2007/0101387 A1 | 5/2007 | Hua et al. |
| 2007/0201558 A1 | 8/2007 | Xu et al. |
| 2008/0065751 A1 | 3/2008 | Hampson |

FOREIGN PATENT DOCUMENTS

| | | |
|---|---|---|
| EP | 1 123 915 A2 | 6/2002 |
| EP | 1478181 A1 | 11/2004 |
| GB | 2 356 080 A | 5/2001 |
| JP | 2000516435 | 12/2000 |
| JP | 2001184802 A | 7/2001 |
| JP | 2002125199 A | 4/2002 |
| JP | 2002223412 | 8/2002 |
| JP | 2002238027 | 8/2002 |
| JP | 2004527019 | 9/2004 |
| KR | 20020009089 A | 2/2002 |
| KR | 20030069635 | 8/2003 |
| KR | 20030070480 | 8/2003 |
| KR | 20040042449 A | 5/2004 |
| KR | 100511785 | 8/2005 |
| KR | 20050087654 | 8/2005 |
| WO | WO9855943 | 12/1998 |
| WO | WO0028467 A1 | 5/2000 |

OTHER PUBLICATIONS

"Probability Measures of Fuzzy Events" Journal of Mathematical Analysis and Applications, 23, 1968, pp. 421-427, Zadeh, L.A.

"Deploying Visual Attention: The Guided Search Model" AI and the Eye Chapter 4, 1990, pp. 79-103, Wolfe et al.

"Modeling Visual Attention Via Selective Tuning Artificial Intelligence" v78, 1995, pp. 507-545, Tsotsos et al.

"Computational Architectures for Attention" The Attentive Brain Chapter 9, pp. 163-186, Nieber et al.

"Focus on Agere System's Orinoco PC Card" International Journal of Network Management, Jan. 2002, pp. 187-193, Held, Gilbert.

"Peer Group Filtering and Perceptual Color Image Quantization" Proceedings of IEEE International Symposium on Circuits and Systems, v4, 1999, pp. 21-24, Deng, et al.

"A Feature-Based Algorithm for Detecting and Classifying Scene Breaks" Computer Science Department, Cornell University, 16 pages, Zabih, Ramin.

"On the Detection and Recognition of Television Commercials" University of Mannheim, 17 pages, Lienhart et al.

"Logo Detection in Digital Video" Math 100, Mar. 6, 2001 http://toonarchive.com/logo-detection/ 9 pages, Hargrove, Thomas.

htpp://www.fatalfx.com/nomad/ "NOMAD (No More Advertising)" Feb. 17, 2003, 4 pages.

"Automatic TV Advertisement Detection from MPEG Bitstream" Centre for Digital Video Processing/Research Institute for Network & Communication Eng., Dublin City University, 12 pages, Sadlier, David.

"AudiCom: A Video Analysis System for Auditing Commercial Broadcasts" Computer Vision Center, Departament d'Informatica Univerisitat Autonoma de Barcelona, 5 pages, Sanchez, Juan Maria.

"A Robust Audio Classification and Segmentation Method" Microsoft Research, China, 9 pages, Lu, et al.

"Content Analysis for Audio Classification and Segmentation" IEEE, Transactions on Speech and Audio Processing, v10, No. 7, Oct. 2002, pp. 504-516, Lu, et al.

"Content-Based Audio Segmentation Using Support Vector Machines" IEEE, 2001, pp. 956-959, Lu, et al.

"Wireless Landscape—Need for Seamless Connectivity" Wireless Personal Communications, 2002, pp. 275-283, Jha, Uma S.

"Pesky Home Networks Trouble Cable Behemoths" IEEE Spectrum, Apr. 2002, pp. 60-61, Cherry, Steven.

"Threshold Selection Using a Minimal Histogram Entropy Difference" Optical Engineering, v36, No. 7, Jul. 1997, pp. 1976-1981, Sahoo, et al.

"Attentive Mechanisms for Dynamic and Static Scene Analysis" Optical Engineering v34, No. 8, Aug. 1995, pp. 2428-2434, Milanese, et al.

"An Effective Region-Based Image Retrieval Framework" From ACM Multimedia 2002, 28 pages, Jing, et al.

"Statistical Learning of Multi-View Face Detection" Proceedings of ECCV 2002, 25 pages, Li, et al.

"Visit: A Neural Model of Covert Visual Attention" Advances in Neural Information Processing Systems, v4, 1991, pp. 420-427, Ahmed, S.

"Expectation-Based Selective Attention for Visual Monitoring and Control of a Robot Vehicle" Robotics and Autonomous System v22, No. 3-4, Dec. 1997, 26 pages, Baluja et al.

"A User Attention Model for Video Summarization" Proceedings of ICIP, 2002, Ma, et al.

"A Visual Attention Model for Adapting Images on Small Displays" ACM Multimedia Systems Journal, Chen, et al.

"Video Shot Cut Detection Using Adaptive Tresholding" University of Surrey, 2000, pp. 1-10, Yusoff, et al.

"Real-time Scene Change Detection on Compressed Multimedia Bitstream Based on Statistical Sequential Analysis" IEEE, 2000, pp. 1141-1144, Lelescu, et al.

"Post Shot Boundary Detection Technique: Flashlight Scene Determination" University of Western Australia, 1999, pp. 447-450, Heng, et al.

"An MPEG-1 Shot Boundary Detector Using XIL Colour Histograms" Dublin City University, 1998, pp. 1-7, O'Toole.

"Robust scene-change detection in MPEG compressed domain" Electrical & Computer Engineering, 1998, pp. 95-99, Gamaz et al.

"Dissolve Detection in MPEG Compressed Video" IEEE, 1997, pp. 1692-1696, Gu, et al.

"Rapid Scene Analysis on Compressed Video" IEEE, 1995, pp. 533-544, Yeo, et al.

"Function-based Object Model Towards Website Adaptation", 2001, Proc. of the 10$^{th}$ International WWW Conference pp. 1-21, Chen, Jinlin et al.

"The JPEG2000 Still Image Coding System: An Overview", IEEE Transactions on Consumer Electronics, v46, No. 4 pp. 1103-1127 Nov. 2000, Christopoulos, et al.

"Perception-based Image Transcoding for Universal Multimedia Access", School of Electrical Engineering Korea University, Seoul, Korea, 2001 IEEE, pp. 475-478, Lee, et al.

"A Model of Motion Attention for Video Skimming" Microsoft Research, Asia, 4 pages, Yu-Fei Ma & Hong Jiang Zhang.

A Comparison of Feature Combination Strategies for Saliency-based Visual Attention Systems: Proc of SPIE Human Vision and Electronic Imaging IV (HVEI '99), San Jose, CA, v3644 Jan. 1999, pp. 473-482, ITTI et al.

"A Model of Saliency-based Visual Attention for Rapid Scene Analysis", IEEE Trans. on Pattern Analysis and Machine Intelligence, 1998, 5 pages, Itti et al.

Video Skimming and Characterization through the Combination of Image and Language Understanding Techniques, Proc. of Computer Vision and Pattern Recognition, 1997 IEEE, pp. 775-781, Smith & Kinkade.

"A New Perceived Motion Based Shot Content Representation", Microsoft Research, China, 4 pages, Yu-Fei Ma & Hong Jiang Zhang.

"Video Scene Extraction by Force Competition" IEEE International Conference on Multimedia and Expo (ICME 011) Waseda University, Tokyo, Japan, Aug. 2001, 4 pages, Lin, et al.

"Evaluation of Automation Shot Boundary Detection on a Large Video Test Suite" School of Computer Applications & School of Electronic Engineering, Dublin City University, Glasnevin Dublin Ireland, Challenge of Image Retrieval Newcastle 1999, pp. 1-12, O'Toole et al.

"Video-Summarization Using Descriptors of Motion Activity: A Motion Activity Based Approach to Key-Frame Extraction From Video-Shots" Journal of Electronic Imaging, Oct. 2001, v10 No. 4 pp. 909-916, Divakaran, et al.

"Computational Modeling of Visual Attention" Nature Reviews/Neuroscience, v2, Mar. 2001, pp. 1-11, ITTI, et al.

(56) References Cited

OTHER PUBLICATIONS

Bennett, et al., "Proscenium: A Framework for Spatio-Temporal Video Editing", MM'03, Nov. 2-3, 2003, Berkeley, California, 8 pages.
Fan, et al., "Visual Attention Based Image Browsing on Mobile Devices", 4 pages.
Foote, et al., "Creating Music Videos using Automatic Media Analysis", 8 pages.
Girgensogn, et al., "A Semi-automatic Approach to Home Video Editing", UIST 2000, San Diego, CA, 9 pages.
Girgensogn, et al., "Home Video Editing Made Easy—Balancing Automation and User Control", 8 pages.
Graham, et al., "The Video Paper Multimedia Playback System", Nov. 2-8, 2003, 2 pages.
Hua, et al., "Automatically Convering Photographic Series into Video", MM '04, Oct. 10-16, 2004, New York, NY, 8 pages.
Hua, et al., "AVE—Automated Home Video Editing", 2003, ACM, 8 pages.
Hua, et al., "Video Booklet", 4 pages.
Yip, et al., "The Automatic Video Editor", Nov. 2-8, 2003, Berkeley, California, 2 pages.
Zhang et al., "A Hierarchical Organization Scheme for Video Data" Pattern Recognition, Elsevier, Kidlington, GB, vol. 35 No. 11, Nov. 2002, pp. 2381-2387.
"Advanced Digital Video Storage and On-line Retrieval System", Advisor Project, Jun. 30, 2002, retrieved from the Internet: http://advisor.matrasi-tls.fr/DUP_workshop_sheet.pdf.
Berlin et al., "Indexing for Resue of TV News Shots" Pattern Recognition, Elsevier, Kidlington, GB, vol. 35, No. 3, Mar. 2002, pp. 581-591.
Lee et al., "Automatic Video Parsing Using Shot Boundary Detection and Camera Operation Analysis" Pattern Recognition, Elsevier, Kidlington, GB, vol. 34, No. 3, Mar. 2001, pp. 711-719.
Adams, et al., "Seeded Region Growing", IEEE, vol. 16, No. 6, 1994, pp. 641-648.
Alexander, et al., "Informedia: News-on-Demand Multimedia Information Acquisition and Retrieval", 1997, pp. 1-21.
DeMenthon, et al., "Video Summarization by Curve Simplification", ACM, 1998, pp. 211-218.
Gong, et al., "Creating Motion Video Summaries with Partial Audio-Visual Alignment", IEEE, 2002, pp. 285-288.
Goncalves, "Towards a Learning Model for Feature Integration in Attention Control", retrieved on Jul. 19, 2006 at <<http://ieeexplore.ieee.org/search/srchabstract.jsp?arnumber=10135533&isnumber=21824&pun>>, International Conference on Multisensor Fusion and Integration for Intelligent Systems, Aug. 20-22, 2001, pp. 311-316.
Osberger, et al., "An Automatic Image Quality Assessment Technique Incorporating Higher Level Perceptual Factors", retrieved on Jul. 19, 2005, at <<http://ieeexplore.ieee.org/search/srchabstract,jsp?arnumber727227&isnumber==15680&punu>>, International Conference on Image Processing, vol. 3, Oct. 4-7, 1998, pp. 414-418.
Beg, "User Feedback Based Enchancement in Web Search Quality", Elsevier Inc., 2004, pp. 20.
Degn, et al., "Peer Group Filtering and Perceptual Color Image Quantization", IEEE, 1999, pp. 8.
Kelly, et al., "Implicit Feedback for Inferring User Preference: A Bibliography", SIGIR Forum, vol. 37, No. 2, 2003, pp. 18-28.
"NOMAD (No More Advertising)", http://www.fatalfx.com/nomad/, Feb. 17 2003, 4 pages.
Pirolli, "Exploring Browser Design Trade-offs Using a Dynamical Model of Optimal Information Foraging", Proc. SIGHI Conference on Human factors in Computing Systems CHI, 1998, pp. 33-40.
Smith, et al., "Scalable Multimedia Delivery for Pervasive Computing", ACM, 1999, pp. 131-140.
Sugiyama, et al., "Adaptive Web Search Based on User s Implicit Preference", DEWS, 2004, pp. 8.

Rauschenbach, et al., "Demand-driven image transmission with levels of detail and regions of interest", Computers & Graphics, 1999, pp. 857-866.
Rauschenbach, et al., "Flexible Embedded Image Communication using Levels of Detail and Regions of Interest", Proc. IMC'98, 1998, pp. 1-10.
Notice of Rejection from Japanese Patent Application No. 2003-375,014, mailed on Sep. 10, 2008, 10 pgs.
Vetro, et al., "Object-Based Transcoding for Adaptable Video Content Delivery", Transactions on Circuits and Systems for Video Technology, IEEE, vol. 11, No. 3, Mar. 2001, pp. 387-401.
Li, "PeerStreaming A Practical P2P Streaming System", Microsoft, Sep. 2004.
Zhuang et al., "Adaptive Key Frame Extraction Using Unsupervised Clustering", Oct. 1998 in IEEE International Conference on Image Processing, vol. 1, pp. 866-870.
Wolf, "Key Frame Selection by Motion Analysis", Conf. Proceedings Acoustics, Speech, and Signal Processing, 1996 IEEE International Conference, May 1996, vol. 2, pp. 1228-1231.
*Ex parte Douglas K. Brubacher and Luciano Passuello*, Board Patent Appeals and Interference, Jan. 22, 2009, 14 pages.
Padmanabhan et al., "Resilient Peer to Peer Streaming", <<http://eprints.kfupm.edu.sa/62381.pdf>>, Mar. 2003, 17 pages.
Uchihashi et al., "Video Manga: Generating Semantically Meaningful Video Summaries", In Proceedings of the Seventh ACM International Conference on Multimedia, Orland Florida, Oct. 30-Nov. 5, 1999, ACM, pp. #383-pp. #392.
Jiang et al., "GnuStream: A P2P Media Streaming System Prototype", 2003 International Conference on Multimedia and Expo, vol. 2 (ICME '03), pp. 325-328.
Wang, "Design and Realization of User Model of Personalized Information Retrieval", Masteral Dissertation, Dalian University of Science and Technology, Dec. 15, 2004, pp. 10-75.
Final Office Action for U.S. Appl. No. 11/278,487, mailed on Jun. 16, 2011, Yu-Fei Ma, "Generating a Motion Attention Model".
The Korean Office Action mailed Nov. 22, 2012 for Korean patent application No. 10-2008-7015218, a counterpart foreign application of US patent No. 7,599,918, 4 page.
The Korean Office Action mailed Feb. 14, 2013 for Korean patent application No. 10-2008-7007991, a counterpart foreign application of US patent No. 8,180,826, 10 pages.
The Japanese Office Action mailed Feb. 23, 2012 for Japanese patent application No. 2005-224585, a counterpart foreign application of US patent No. 7,986,372, 2 pages.
The Extended European Search Report mailed Feb. 1, 2012 for European patent application No. 06849037.4, 10 pages.
The Japanese Office Action mailed Sep. 1, 2011 for Japanese patent application No. 2005-224585, a counterpart foreign application of US patent No. 7,986,372, 2 pages.
Office Action for U.S. Appl. No. 11/263,718, mailed on Sep. 8, 2011, Xian-Sheng Hua, "Template-Based Multimedia Authoring and Sharing", 7 pgs.
Non-Final Office Action for U.S. Appl. No. 11/279,793, mailed by Sep. 15, 2011, Xian-Sheng Hua, "Media Sharing and Authoring on the Web", 21 pages.
Shen, et al., "Implicit User Modeling for Personalized Search", Proceedings of teh 14th ACM International Conference on Information and Knowledge Management, ICKM, Oct. 31, 2005, pp. 824-831, retrieved from the internet at http://dl.acm.org/citation.cfm?doid=1099554.1099747 on Jan. 19, 2012.
The Korean Office Action mailed Aug. 27, 2013 for Korean patent application No. 10-2008-7007991, a counterpart foreign application of US patent No. 8,180,826, 13 pages.
The Korean Office Action mailed Mar. 17, 2014 for Korean patent application No. 10-2008-7007991, a counterpart foreign application of U.S. Appl. No. 11/279,793, 11 pages.
Dufaux, "Key frame selection to represent a video", Proc. 2000 Int. Con. on Image Processing, vol. 2, Sep. 2000, pp. 275-278.

* cited by examiner

| | THUMBNAIL ID | TV ID | PROGRAM TITLE | RATING | SHOW THUMB. |
|---|---|---|---|---|---|
| 220(1) | 00032.TMP | 31456 | CSI: MIAMI | TV 14 | NO |
| | : | : | : | : | : |
| 220(N) | 04520.PMT | 63290 | RUGRATS | ALL | YES |

FIG. 2

THUMBNAIL GENERATION AND PRESENTATION FOR RECORDED TV PROGRAMS

TECHNICAL FIELD

The present invention generally relates to TV recording systems, and more particularly, to ways to generate and present thumbnails derived from recorded TV programs.

BACKGROUND

With the convergence of home entertainment technologies, there are a growing number of devices that store many different forms of content, such as music, movies, pictures, TV programs, videos, games, and so forth. Devices like digital video recorders (DVRs), game consoles, and entertainment-configured computers (e.g., computers that run the Windows® XP Media Center operating system from Microsoft Corporation) enable users to record, manage, and playback many different forms of content. Even less featured devices, such as set-top boxes, can be designed to record multiple types of content.

As such devices are configured to store more content and offer more functionality, the ability to present the various forms of recorded content in a cohesive, understandable, and user-friendly manner continues to be a challenge. This is particularly true for recorded TV programs. Traditionally, home entertainment devices have simply provided a title or other text identifier of recorded TV programs. It would be useful if other techniques for identifying and navigating recorded TV programs were developed.

SUMMARY

Thumbnail images representative of recorded TV programs are generated and presented to aid a user in browsing the recorded TV programs. In one implementation, a temporary thumbnail image is generated when a TV program first starts recording. The temporary thumbnail is used to populate quickly any user interface (UI) screens that reference the TV program, even as the program is recording. Once the TV program has reached a threshold amount of recording (e.g., a prescribed duration of recording or completion of the recording), a permanent thumbnail image is generated and associated with the TV program. The permanent thumbnail is then presented in any subsequent UI screens that reference the TV program, replacing the temporary thumbnail. The user can navigate among the thumbnail images presented in the various UI screens and select a particular recorded TV program by choosing the corresponding thumbnail image. According to another implementation, display of the thumbnail images within the UI screens may be further controlled by preference settings, such as parental controls.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIG. 2 illustrates a data structure used by the client device of FIG. 1 to associate thumbnail images with corresponding TV programs.

DETAILED DESCRIPTION

The following disclosure describes techniques for generating and presenting thumbnail images that are representative of recorded TV programs. The thumbnail images, or simply "thumbnails", are created from actual video content of the TV programs and hence, are visually descriptive of the recorded programs. The thumbnail images are presented in a user interface to assist a viewer in browsing among the recorded TV programs and selecting a particular recorded TV program.

The following discussion is directed generally to entertainment systems, and particularly to television-based systems, such as broadcast TV systems, interactive TV systems, cable TV systems, and Web-enabled TV systems. While aspects of the described systems and methods can be implemented in any number of television-enabled entertainment systems, and within any number and types of client devices, the systems and methods are described in the context of the following exemplary system.

Figure 1:
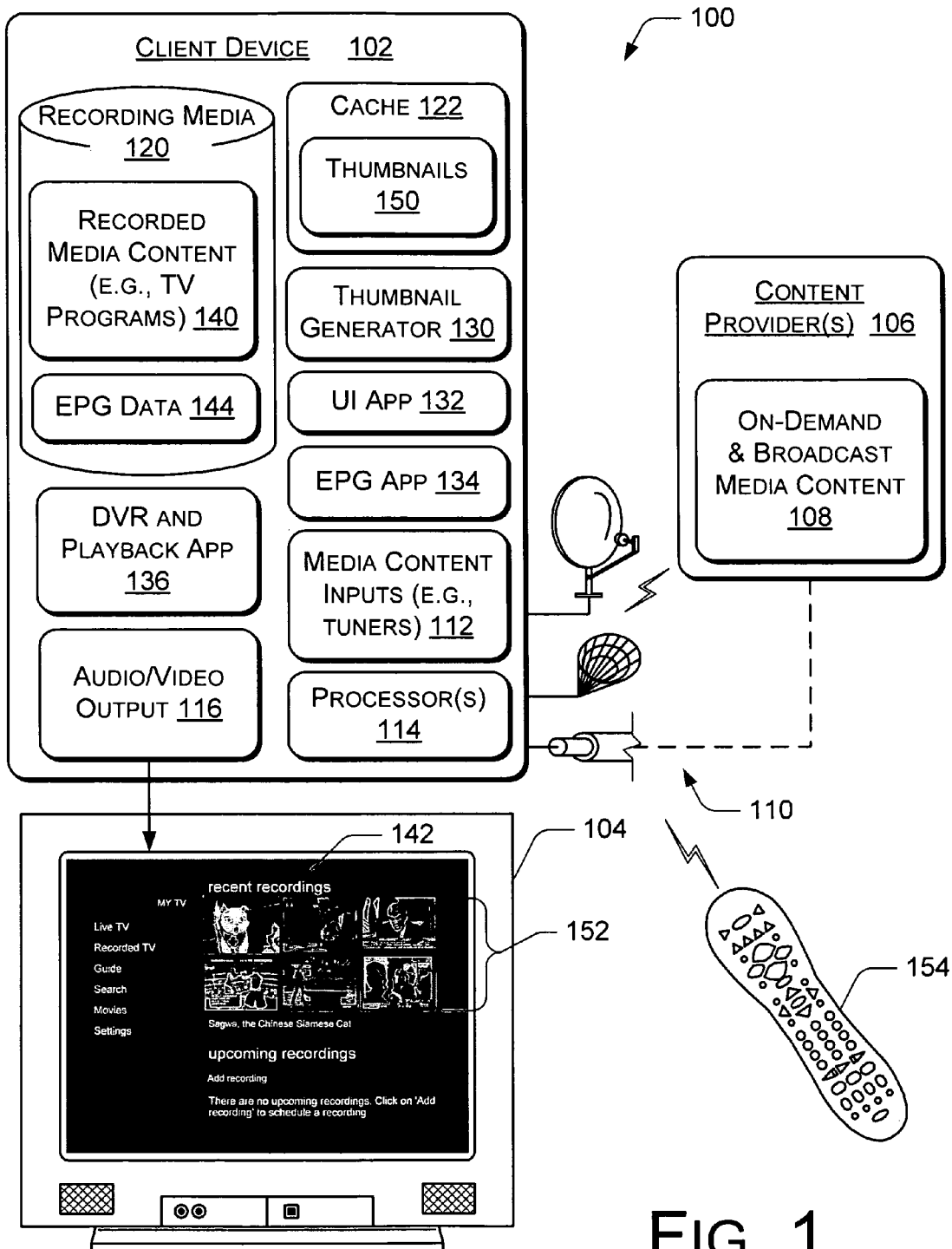
FIG. 1 illustrates a system in which TV content is delivered from a content provider to a client device and recorded for subsequent playback. The system represents an exemplary environment in which thumbnail generation and presentation for recorded TV programs can be implemented.

FIG. 1 illustrates an exemplary system 100 for recording TV programs and generating representative thumbnails for purposes of browsing the recorded TV programs. System 100 includes a client device 102, a display 104 (e.g., television, monitor, etc.), and one or more content providers 106. The content providers 106 control distribution of on-demand and/or broadcast media content 108, such as movies, TV programs, commercials, music, and similar audio, video, and/or image content. Content providers 106 are representative of satellite operators, network television operators, cable operators, Web-based content providers, and the like.

The client device 102 receives and stores the media content 108 distributed by the content providers 106. In particular, the client device 102 is configured to receive and record TV programs broadcast or otherwise transmitted by the content providers 106. Examples of TV programs include news, sitcoms, comedies, TV movies, infomercials, talk shows, sporting events, and so on. The client device 102 can be implemented in many ways, including as a TV-enabled computer, a computer-based media server, a set-top box, a satellite receiver, a TV recorder with a hard disk, a digital video recorder (DVR), a game console, an information appliance, and so forth.

The client device 102 receives the media content 108 via various transmission media 110, such as satellite transmission, radio frequency transmission, cable transmission, and/or via any number of other transmission media, such as a file transfer protocol over a network (e.g., Internet or Intranet) and/or data packet communication. The client device 102 includes one or more media content inputs 112, which may include tuners that can be tuned to various frequencies or channels to receive television signals and/or Internet Protocol (IP) inputs over which streams of media content are received via an IP-based network.

The client device 102 also includes one or more processors 114 which process various instructions to control operation of client device 102, to execute applications stored on the client device, and to communicate with other electronic and computing devices. The processors 114 may further include a content processor to receive, process, and decode media content and program data. The client device 102 is also equipped with an audio/video output 116 that provides audio and video data to the display 104, or to other devices that process and/or display, or otherwise render, the audio and video data. Video and audio signals can be communicated from the client device 102 to the display 104 via an RF (radio frequency) link, S-video link, composite video link, component video link, analog audio connection, or other similar communication links.

The client device 102 is equipped with different types of memory components, including both volatile and non-volatile memory. In this example, the client device 102 has a recording media 120 and a cache 122. The recording media 120 may be implemented in many ways using various non-volatile storage media, such as hard disk drives, RAID systems, recordable and/or rewritable discs, and so forth. Cache 122 can be implemented, for example, as random access memory (RAM) for faster access during data processing in client device 102. Although not shown, the client device may further include one or more data memory components as well as a program memory to store applications.

One or more application programs can be stored in program memory and executed by the processor(s) 114. Representative applications shown in FIG. 1 include a thumbnail generator 130, a user interface (UI) application 132, an electronic program guide (EPG) application 134, and a DVR and playback application 136. An operating system (not shown) may also be maintained in storage and executed on processor(s) 114.

The DVR and playback application 136 records media content received from the content providers 106 in the recording media 120. The recorded media content 140 includes TV programs that a viewer has recorded to watch at a later time. The DVR and playback application 136 also facilitates playback of the recorded media content 140 on the display 104.

The UI application 132 allows a user to browse and select content recorded on the client device 102. The UI application 132 supports interactive and graphical UI screens that identify the media content 140 stored in the recording media 120 and offer options for handling the media content 140 in some manner. For example, the UI screens might enable navigation to various recorded content (e.g., audio, still images, video, TV programs, etc.), list recently recoded content, or provide detailed information on specific content. One exemplary UI screen 142 is depicted on the display 104. This UI screen 142 shows the most recently recorded TV programs.

The EPG application 134 generates a program guide for presentation on the display 104. The program guide includes a schedule indicating when particular content will be broadcast for viewing and on which channel the content will be broadcast. The EPG application 134 enables a viewer to navigate through the program guide and locate broadcast programs, recorded programs, video on-demand programs and movies, interactive game selections, and other media access information or content of interest to the viewer. EPG data 144 is downloaded from the content providers 106 and stored in recording media 120, where it is accessed by the EPG application 134 to populate the program guide.

The thumbnail generator 130 creates thumbnail images 150 representative of the recorded TV programs and stores the thumbnail images 150 in the cache 122. The thumbnail images, or just "thumbnails", are derived from the actual video content of the TV programs and are used by the UI application 132 and/or the EPG application 134 to visually represent the recorded TV programs in the UI screens. By storing the thumbnails 150 in the cache 122, the thumbnails 150 are available for immediate retrieval to populate the appropriate UI screens. The thumbnails 150 may alternatively, or additionally, be stored in other memory, such as the recording media 120.

In FIG. 1, the UI screen 142 shows six thumbnail images 152 created from recorded TV programs stored in the recording media 120. The thumbnails show representative video frames from related TV programs so that the viewer will visually associate a stored program with the depicted thumbnail. The viewer can then navigate the screen 142 using an input device, such as remote control handset 154, to browse among the thumbnails as a way to ascertain what TV programs are recorded on the recording media 120. With the handset 154, the viewer can select a thumbnail to cause the client device 102 (and namely, the DVR and playback application 136) to playback the recorded TV program associated with the thumbnail.

According to one implementation, the thumbnail generator 130 is configured to create two thumbnails as the TV program is being recorded. A temporary thumbnail is derived when the TV program first begins recording. In one implementation, the temporary thumbnail is derived from a video frame extracted from a beginning portion of the TV program. For instance, the thumbnail generator 130 selects the first non-black video frame in the TV program from which to derive the temporary thumbnail. In this manner, the thumbnail image is generated within seconds and is available for immediate display in a UI screen as soon as the TV program begins recording.

A permanent thumbnail is subsequently generated when more of the TV program has been recorded. The permanent thumbnail is generated using video detection techniques which rely on analysis of a larger portion of the TV program. Such analysis might include, for example, avoidance of a black frame, avoidance of any frames associated with a commercial, avoidance of padding, scene analysis, examination of program metadata, and so forth. One example of a suitable technique for isolating and deriving thumbnail candidates from a recorded video program is disclosed in U.S. Pat. No. 7,986,372, entitled "Systems and Methods for Smart Media Content Thumbnail Extraction", which was filed Aug. 2, 2004, and is assigned to Microsoft Corporation. The video detection techniques may be performed on the program after a predetermined amount is recorded (e.g., 15 minutes, 30 minutes, etc.) or after the entire program is recorded.

The thumbnail created from the TV program can be static or dynamic. A static thumbnail contains a still image generated from the video content. A dynamic thumbnail consists of multiple images generated from the TV program, which are then played in a continuous loop so that the thumbnail appears animated.

The temporary and permanent thumbnails 150 are stored in the cache 122 in association with corresponding TV programs so that when the UI application 132 and/or the EPG application 134 display information about a particular TV program, the corresponding thumbnail is retrieved from the cache 122 and presented in a UI screen. One way to associate the thumbnails with the TV programs is via a data structure stored in memory, such as program or data memory.

FIG. 2 shows one example data structure 200 used to associate the thumbnail images 150 with the corresponding TV programs stored in recording media 120. The data structure 200 includes multiple data fields that hold and correlate information for each record entry. In this example, the data fields include a thumbnail identifier field 202, a TV identifier field 204, a program title field 206, a rating field 208, and a show thumbnail field 210. It is noted that more or less fields may used in such a data structure, and that the illustrated structure is just one example.

Multiple entries 220(1)-220(N) are shown in the data structure 200. Each entry contains information pertaining to a TV program. Here, entry 220(1) is for a TV program entitled "CSI: Miami", which has an identifier of "31456" and a content rating of "TV 14". This TV program is associated with a temporary thumbnail identified as "00032.TMP". Entry 220(1) is an example of a TV program that has just started recording, and hence has a temporary thumbnail associated therewith.

Another entry 220(N) is for a TV program titled "Rugrats", which has an identifier of "63290" and a content rating of "All". This TV program is associated with a permanent thumbnail identified as "04520.PMT". Entry 220(N) is an example of a TV program that has been recording a sufficient amount of time (or has been completely recorded), and hence has a permanent thumbnail associated therewith.

An aspect of the described system is that the thumbnail images generated from the TV programs may or may not be displayed based on preferences established by the viewer. For instance, suppose a parent has established parental controls that prevent display of programs with a TV14 or higher rating at certain times of operation, or on certain displays viewed by younger viewers in the home. In this case, the parent would most likely prefer not to have a thumbnail image of the corresponding content displayed in various UI menus or listings. Accordingly, the show thumbnail field 210 dictates when a thumbnail should be displayed based on the rating provided in the rating field 208. In this example, if the rating is TV14 or higher, as is the case for the TV program "CSI: Miami" at entry 220(1), the entry contains a "No" data item in the show thumbnail field 210 to indicate that the associated thumbnail should not be shown. The thumbnail image can be replaced with a blank image, a logo of the TV rating, an icon, or other form of generic image. If the rating is less than TV14, as is the case for the TV program "Rugrats" at entry 220(N), a "Yes" data item is in the show thumbnail field 210 to indicate that the associated thumbnail can be shown.

In another implementation, the determination of whether to display a thumbnail based on viewer preferences may be made without maintaining a flag designator in show thumbnail field 210 for each associated recorded program (thereby eliminating the use of field 210 in data structure 200). In this alternate implementation, preferences are maintained in a separate memory location and the determination is made by dynamically comparing the rating of the recorded show against the current preferences to decide whether to depict the thumbnail at the time the thumbnail is to be displayed. In this manner, if the preferences are changed at anytime, the change is made quickly in this single memory location rather than updating every flag designator in the show thumbnail field 210 for all recorded programs.

Figure 3:
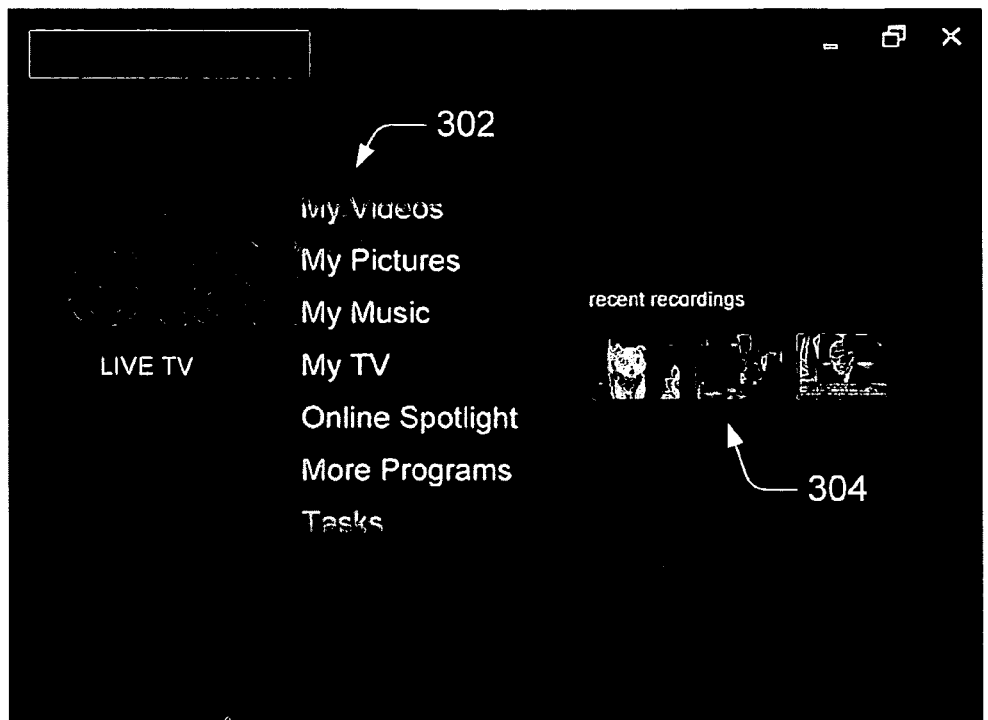
FIG. 3 shows a "Start" graphical UI screen that is presented when a viewer wishes to access various forms of content on the client device of FIG. 1.

FIGS. 3-6 show various examples of UI screens that depict the temporary and/or permanent thumbnail images. FIG. 3 shows a "Start" UI screen 300, which is initially presented to a viewer when accessing various forms of content stored on the client device 102. In this example, the UI screen 300 has a menu 302 of different types of content the viewer might wish to access, including videos, pictures, music, TV, and other content. Adjacent the menu 302 are three thumbnail images 304 that are associated with the three most recently recorded TV programs. These thumbnails 304 may be temporary or permanent, depending upon how much of the corresponding program has been recorded. As an example, the first thumbnail depicting a cartoon cat could be a temporary thumbnail derived from the first few frames of a cartoon that the client device 102 has just started recording. The second and third thumbnails might represent permanent thumbnails generated from TV programs that have already been recorded. It is noted that as more of the cartoon is recorded, a permanent thumbnail image will be generated and later replace the temporary thumbnail image on the "Start" UI screen 300.

Figure 4:
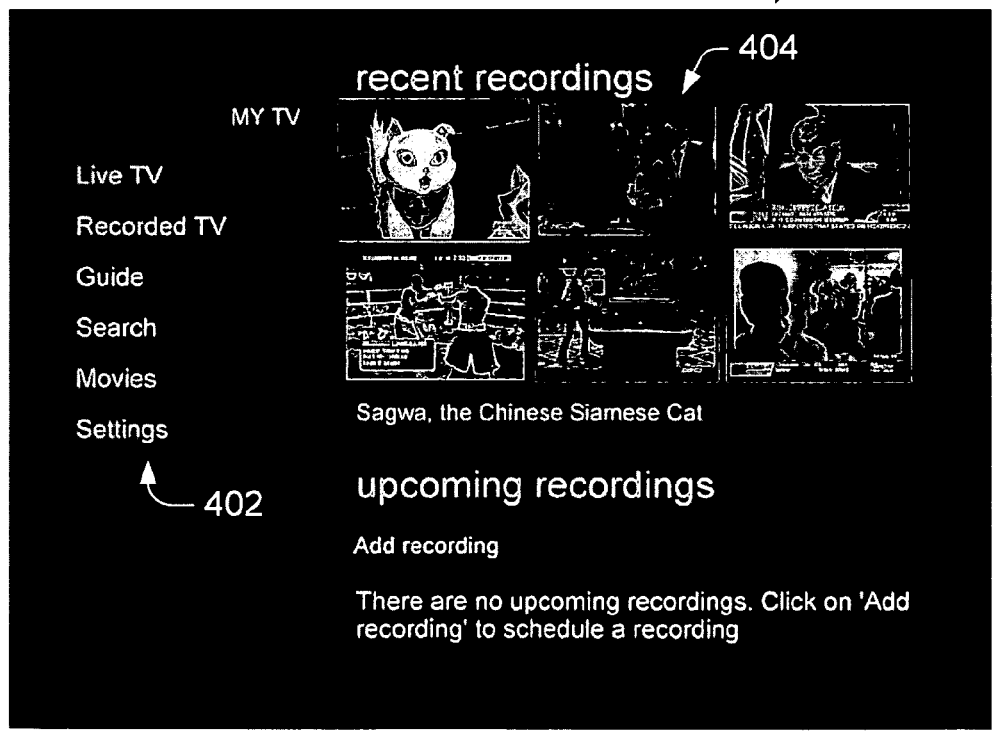
FIG. 4 shows a "My TV" graphical UI screen that is presented upon selection of a menu item in the "Start" graphical UI screen of FIG. 3.

FIG. 4 shows a "My TV" UI screen 400, which is presented upon selection of the "My TV" item in menu 302 of the "Start" UI screen 300 (FIG. 3). The "My TV" UI screen 400 has a menu 402 of operational choices for the viewer, including a listing of live TV programs currently playing, a listing of recorded TV programs stored on the device 102, a program guide, a search feature, a listing of movie selections, and operational settings. A set of six thumbnail images 404 representing the six most recently recorded TV programs are also depicted on the UI screen 400. These thumbnails 404 may include temporary thumbnails and/or permanent thumbnails.

Figure 5:
FIG. 5 shows a "Recorded TV" graphical UI screen that is presented upon selection of a menu item in the "My TV" graphical UI screen of FIG. 4.

FIG. 5 shows a "Recorded TV" UI screen 500, which is presented upon selection of the "Recorded TV" item in menu 402 of the "My TV" UI screen 400 (FIG. 4). The "Recorded TV" UI screen 500 has a menu 502 of operational choices to sort the recorded TV programs by date or by name, to add a recording, schedule a recording, or create a CD/DVD of the recorded program. To the right of the menu 502 is a listing 504 of recorded TV programs represented by the associated thumbnail image, a program title, and the date/time it was recorded. Once again, the thumbnails used in this listing 504 may include temporary thumbnails and/or permanent thumbnails.

Figure 6:
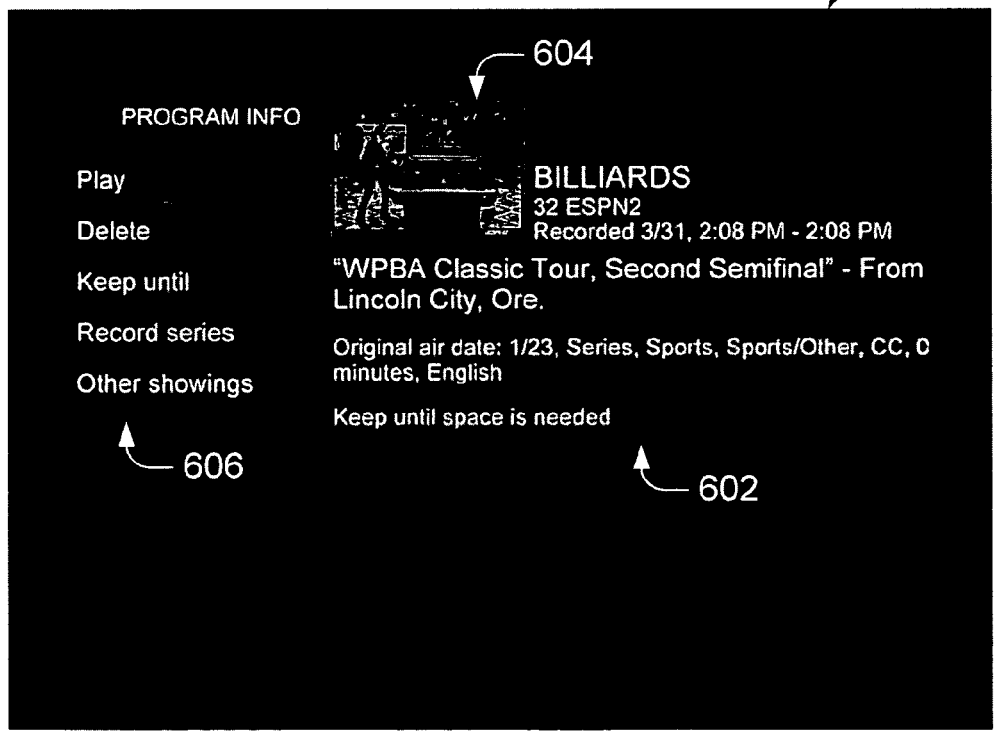
FIG. 6 shows a "Program Info" graphical UI screen that is presented upon selection of a particular program listed in the "Recorded TV" graphical UI screen of FIG. 5.

FIG. 6 shows a "Program Info" UI screen 600, which is presented upon selection of a particular program in listing 504 of the "Recorded TV" UI screen 500 (FIG. 5). The "Program Info" UI screen 600 shows more detailed information 602 on a selected program, such as the program title, a brief description, when it was recorded and from which channel, and so forth. Included with this detailed information is a thumbnail image 604 to visually convey a sample of the content in the TV program. The thumbnail 604 may be temporary at first, but is later replaced with a permanent thumbnail when a sufficient amount of the program has been recorded. The "Program Info" UI screen 600 also has a menu 606 of operational choices to play the program, delete the program, set a "keep until" date for maintaining the program, and record a series of programs.

Figure 7:
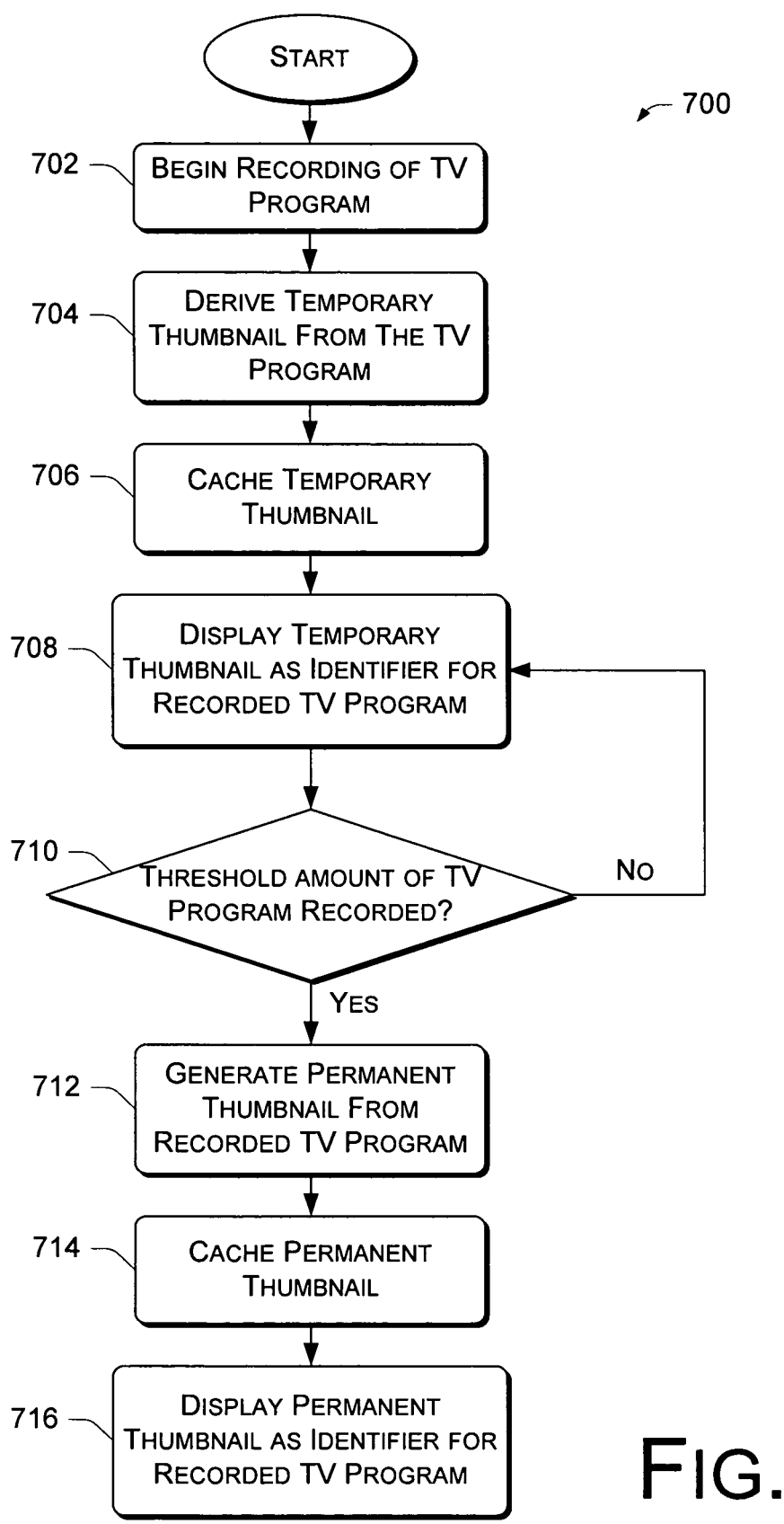
FIG. 7 shows a process for generating and presenting thumbnail images in conjunction with recorded TV programs.

FIG. 7 shows a process 700 for generating and presenting thumbnail images in conjunction with recorded TV programs. The process 700 is illustrated as a collection of blocks in a logical flow graph, which represent a sequence of operations that can be implemented in hardware, software, firmware, or any combination thereof. In the context of software and/or firmware, the blocks represent computer instructions that, when executed by one or more processors, perform the recited operations.

For discussion purposes, the process 700 is described with reference to the system 100 described above with respect to FIG. 1. It is noted that the process 700 may be implemented by other types of systems that are designed to record and playback TV programs.

At block 702, the client device 102 begins recording a TV program. During this initial recording, the thumbnail generator 130 derives a temporary thumbnail image representative of the TV program (block 704). This temporary thumbnail is quickly created, for example, from the beginning portion of the TV program. The derivation involves at least minimum logic to ensure that the thumbnail generator 130 avoids extracting a black frame. Thus, the thumbnail generator 130 might be configured to extract the first non-black frame from the TV program and derive a thumbnail image from that frame.

At block 706, the temporary thumbnail image is stored in the cache 122. At block 708, the temporary thumbnail is displayed as part of any UI screens that identify recorded TV programs, such as the example UI screens 300, 400, 500, and 600 (FIGS. 3-6). As the program continues recording, a permanent thumbnail is generated from the recorded content. To ensure that a highly representative thumbnail is created, a larger portion of the recorded program is analyzed.

Accordingly, decision block 710 determines whether a threshold amount of the TV program has been recorded. This threshold amount may be measured in number of frames, duration, or other ways. For instance, the client device 102 may be configured to begin generating a permanent thumbnail after 1000 frames have been recorded, or after 15 minutes of the program has been recorded, or alternatively after the entire program has been recorded. If a sufficient portion of the TV program has not yet been recorded (i.e., the "No" branch from block 710), the client device 102 continues to use the temporary thumbnail in the cache 122.

Alternatively, if a sufficient portion of the TV program has been recorded (i.e., the "Yes" branch from block 710), the thumbnail generator 130 generates a permanent thumbnail representative of the recorded TV program (block 712). The thumbnail generator 130 uses video detection techniques to generate the image. It analyzes the frames of the recorded program, relying on significant logic to avoid black frames and frames from commercials, to ignore pre-padding and post-padding, to consider head shots, and use program metadata (e.g. category/genre). Once the frames are analyzed, a representative video frame is selected and the thumbnail image is derived from that selected frame.

At block 714, the permanent thumbnail image is stored in the cache 122. The permanent thumbnail can be stored over the temporary thumbnail, thereby deleting the temporary thumbnail from the cache, or alternatively, stored in addition to the temporary thumbnail. In any event, at block 716, the permanent thumbnail is displayed as part of any UI screens that identify recorded TV programs, such as the example UI screens 300, 400, 500, and 600 (FIGS. 3-6), thereby replacing the temporary thumbnail in such UI screens.

Figure 8:
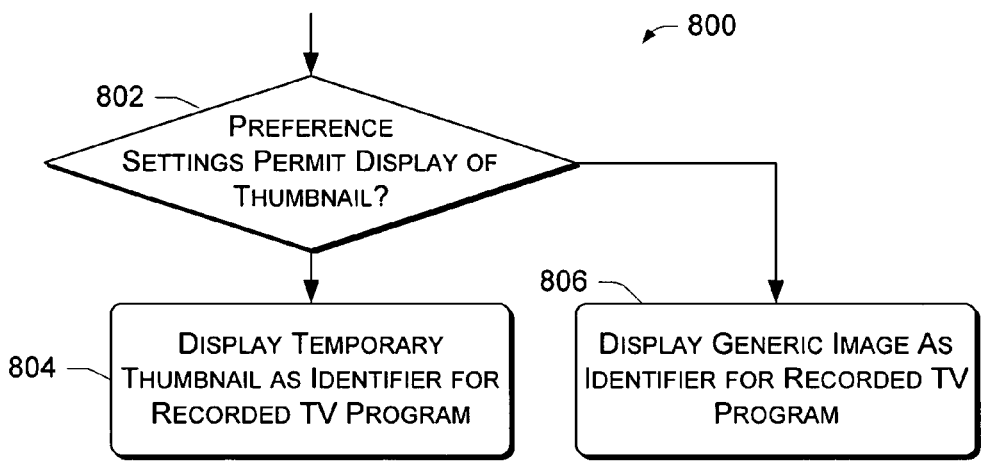
FIG. 8 shows a process for controlling display of the thumbnail images based on user preference settings.

FIG. 8 shows a process 800 for controlling display of the thumbnail images based on parental control or other user preference settings. At block 802, the client device 102 determines whether preference settings, such as parental controls, permits display of the thumbnail images. If permitted (i.e., the "Yes" branch from block 802), the client device 102 displays the thumbnails (temporary or permanent) within the UI screens as identifiers for the recorded TV program (block 804). Conversely, if not permitted (i.e., the "Yes" branch from block 802), the client device 102 displays some other generic image in place of the thumbnail (block 806) or, alternatively, foregoes altogether any display of another image.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
    recording at a client device, at least a portion of a TV program;
    deriving from the TV program, during initial recording of the TV program before the recorded portion of the TV program exceeds a threshold portion of the TV program, a temporary thumbnail representative of the TV program, the temporary thumbnail being formed from a particular video frame in the TV program;
    when the recorded portion of the TV program exceeds the threshold portion of the TV program, generating from the recorded portion of the TV program, a permanent thumbnail representative of the recorded portion of the TV program, the permanent thumbnail being formed from a video frame in the recorded portion of the TV program, the video frame selected as a representative video frame based on a scene analysis of the recorded portion of the TV program; and
    presenting, by the client device, the temporary thumbnail within an electronic program guide (EPG) listing of programs that are at least partially recorded until the permanent thumbnail is generated, and thereafter presenting the permanent thumbnail within the EPG listing of TV programs that are at least partially recorded instead of the temporary thumbnail.

2. A method as described in claim 1, wherein the deriving comprises forming the temporary thumbnail based on a particular video frame from a beginning portion of the TV program.

3. A method as described in claim 1, wherein the particular video frame is a first non-black video frame in the TV program.

4. A method as described in claim 1, wherein the particular video frame and the video frame selected based on the scene analysis are different video frames of the TV program.

5. A method as described in claim 1, further comprising presenting a plurality of thumbnails within the EPG listing of TV programs that are at least partially recorded.

6. A method as described in claim 1, further comprising:
    presenting a plurality of thumbnails within the EPG listing of TV programs that are at least partially recorded; and
    enabling a user to browse the TV programs that are at least partially recorded by navigating the plurality of thumbnails.

7. A method as described in claim 1, further comprising caching at least one of the temporary thumbnail or the permanent thumbnail.

8. A method as described in claim 1, wherein at least one of the temporary thumbnail or the permanent thumbnail is dynamic.

9. A method as described in claim 1, further comprising:
    associating the temporary thumbnail and the permanent thumbnail with a content rating that is subject to a preference setting;
    presenting the temporary thumbnail and the permanent thumbnail in an event that the preference setting for the associated content rating permits viewing; and preventing presentation of the temporary thumbnail and the permanent thumbnail in an event that the preference setting for the associated content rating does not permit viewing.

10. A method as described in claim 1, wherein the scene analysis is performed on a plurality of video frames corresponding to the recorded portion of the TV program to select a frame based at least in part on program metadata.

11. A method as described in claim 1, wherein the scene analysis is performed on a plurality of video frames corresponding to the recorded portion of the TV program to select a frame based at least in part on consideration of head shots.

12. A method as described in claim 1, wherein the scene analysis is performed on a plurality of video frames corresponding to the recorded portion of the TV program to avoid selecting a black frame.

13. A method as described in claim 1, wherein the scene analysis is performed on a plurality of video frames corresponding to the recorded portion of the TV program to avoid selecting a frame from a commercial.

14. A method as described in claim 1, wherein the scene analysis is performed on a plurality of video frames corresponding to the recorded portion of the TV program to avoid selecting a padding frame.

15. A computer storage device comprising computer-executable instructions that, when executed, direct a device to:
derive, during initial recording of a TV program, a temporary thumbnail from a video frame extracted from an early portion of the TV program;
present the temporary thumbnail in an electronic program guide (EPG) user interface as an identifier of the TV program;
determine, after the initial recording of the TV program, that a recorded portion of the TV program exceeds a threshold;
generate, in response to determining that the recorded portion of the TV program exceeds the threshold, a permanent thumbnail from a video frame selected from the recorded portion of the TV program as a representative video frame based on an analysis of the recorded portion of the TV program; and
upon generating the permanent thumbnail, presenting the permanent thumbnail, instead of the temporary thumbnail, in the EPG user interface as an identifier of the TV program.

16. A computer storage device as recited in claim 15, further comprising computer-executable instructions that, when executed, direct the device to:
present a plurality of thumbnails within the EPG user interface; and
enable a user to browse the TV programs by navigating the plurality of thumbnails.

17. A computer storage device as recited in claim 15, further comprising computer-executable instructions that, when executed, direct the device to cache at least one of the temporary thumbnail or the permanent thumbnail.

18. A computer storage device as recited in claim 15, further comprising computer-executable instructions that, when executed, direct the device to:
associate the temporary thumbnail and the permanent thumbnail with a content rating that is subject to a preference setting; and
prevent presentation of the temporary thumbnail and the permanent thumbnail in an event that the preference setting for the associated content rating does not permit viewing.

19. A computer storage device as recited in claim 15, wherein the analysis of the recorded portion of the TV program includes analysis of program metadata to evaluate associations between a plurality of video frames in the recorded portion of the TV program and the program metadata.

20. A device comprising:
a memory device to store the TV program;
a processor; and
the computer storage device as recited in claim 15, operatively coupled to the processor so that when the processor executes the computer-executable instructions, the device derives the temporary thumbnail and generates the permanent thumbnail from the recorded portion of the TV program stored in the memory device.

21. A device comprising:
a recorder to record a TV program onto a recording medium;
a thumbnail generator to:
form a temporary thumbnail while the TV program is being recorded, and before a threshold portion of the TV program has been recorded, wherein the temporary thumbnail is formed from a first video frame of a recorded portion of the TV program;
select a second video frame from the TV program as the TV program is being recorded, wherein the second video frame is selected after a threshold portion of the TV program has been recorded; and
form a permanent thumbnail from the second video frame, the permanent thumbnail being representative of the TV program; and
an electronic program guide (EPG) user interface to present the temporary thumbnail and the permanent thumbnail temporally in succession as identifiers of the TV program.

22. A device as recited in claim 21, wherein the thumbnail generator forms the temporary thumbnail from a first non-black video frame in the TV program.

23. A device as recited in claim 21, wherein the EPG user interface presents the temporary thumbnail until the permanent thumbnail is formed, and thereafter presents the permanent thumbnail instead of the temporary thumbnail.

24. A device as recited in claim 21, further comprising a cache to store the temporary thumbnail and the permanent thumbnail.

25. A device as recited in claim 21, further comprising a data structure to associate the temporary thumbnail with a content rating, wherein the EPG user interface presents the temporary thumbnail in an event that a preference setting for the content rating permits viewing and the EPG user interface prevents presentation of the temporary thumbnail in an event that the preference setting for the content rating does not permit viewing.

26. A device as described in claim 21, wherein
the second video frame is selected based at least in part on consideration of headshots.

27. A device as described in claim 21, wherein the thumbnail generator selects the second video frame further based on program metadata and a scene analysis of a plurality of video frames corresponding to a recorded portion of the TV program to evaluate associations between the plurality of video frames and the program metadata.

28. A device as described in claim 27, wherein the program metadata includes at least a program genre.

29. A device comprising:
means for deriving, during initial recording of a TV program, a temporary thumbnail representative of the TV program, wherein the deriving comprises forming the temporary thumbnail based on a first video frame;

means for determining that a recorded portion of the TV program exceeds a threshold;

means for subsequently generating, in response to the determining, a permanent thumbnail representative of the TV program, wherein the generating comprises forming the permanent thumbnail based on a second video frame selected based on an analysis of the recorded portion of the TV program and program metadata to evaluate associations between a plurality of video frames in the recorded portion of the TV program and the program metadata; and means for presenting the temporary thumbnail within an electronic program guide (EPG) listing of programs that are at least partially recorded until the permanent thumbnail is generated, and thereafter presenting the permanent thumbnail within the EPG listing of programs that are at least partially recorded instead of the temporary thumbnail.

30. A device as described in claim 29, wherein the deriving means comprises means for forming the temporary thumbnail based on a first non-black video frame in the TV program.

31. A device as described in claim 29, wherein the first and second video frames are different video frames of the TV program.

32. A device as described in claim 29, further comprising:

means for presenting a plurality of thumbnails within the EPG listing of TV programs that are at least partially recorded; and means for enabling a user to browse the TV programs that are at least partially recorded by navigating the plurality of thumbnails.

\* \* \* \* \*